Sept. 5, 1967     J. E. BLONSKY     3,339,656
LOG-SKIDDING AIR PAN
Filed Oct. 22, 1965     2 Sheets-Sheet 1
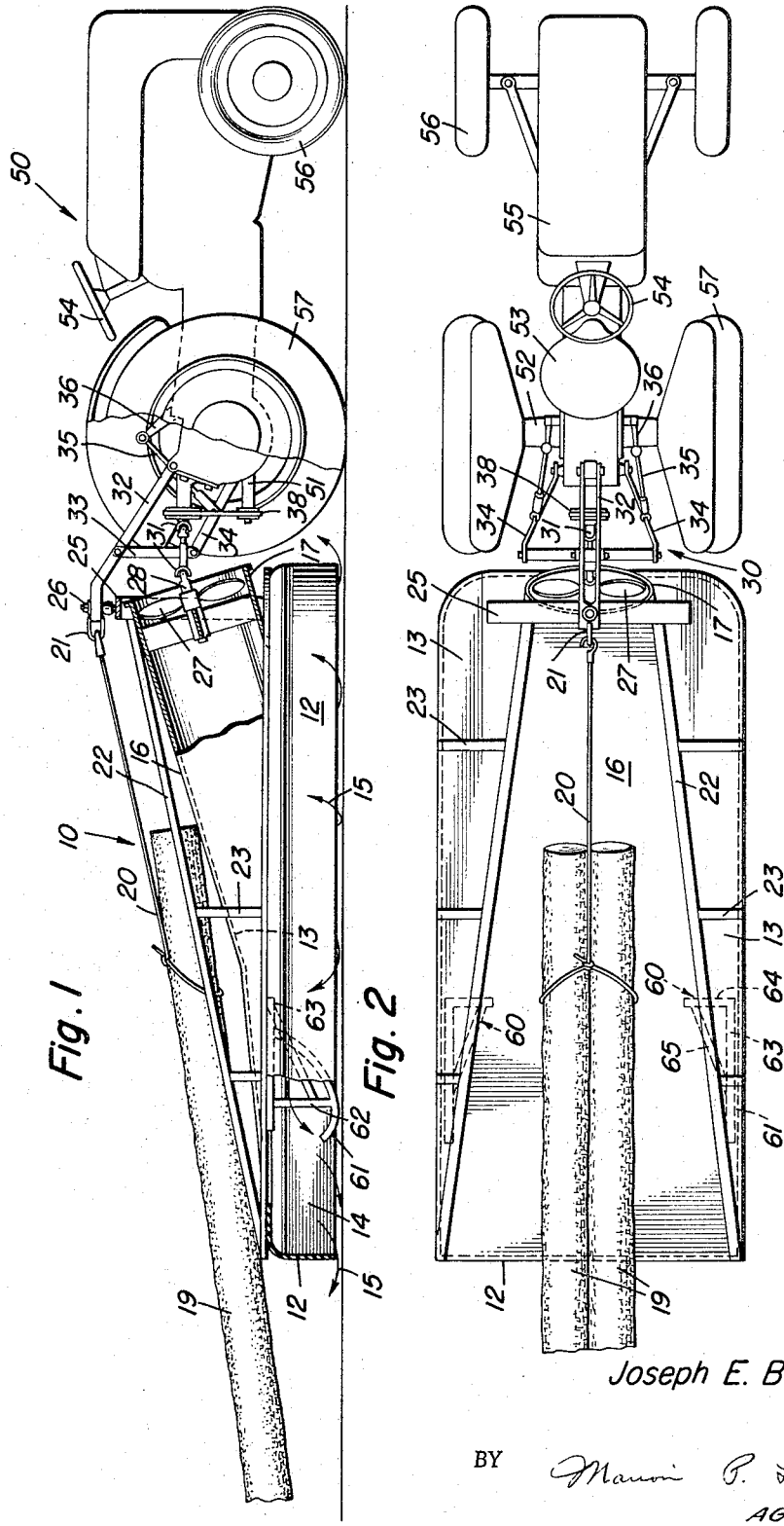
INVENTOR
Joseph E. Blonsky

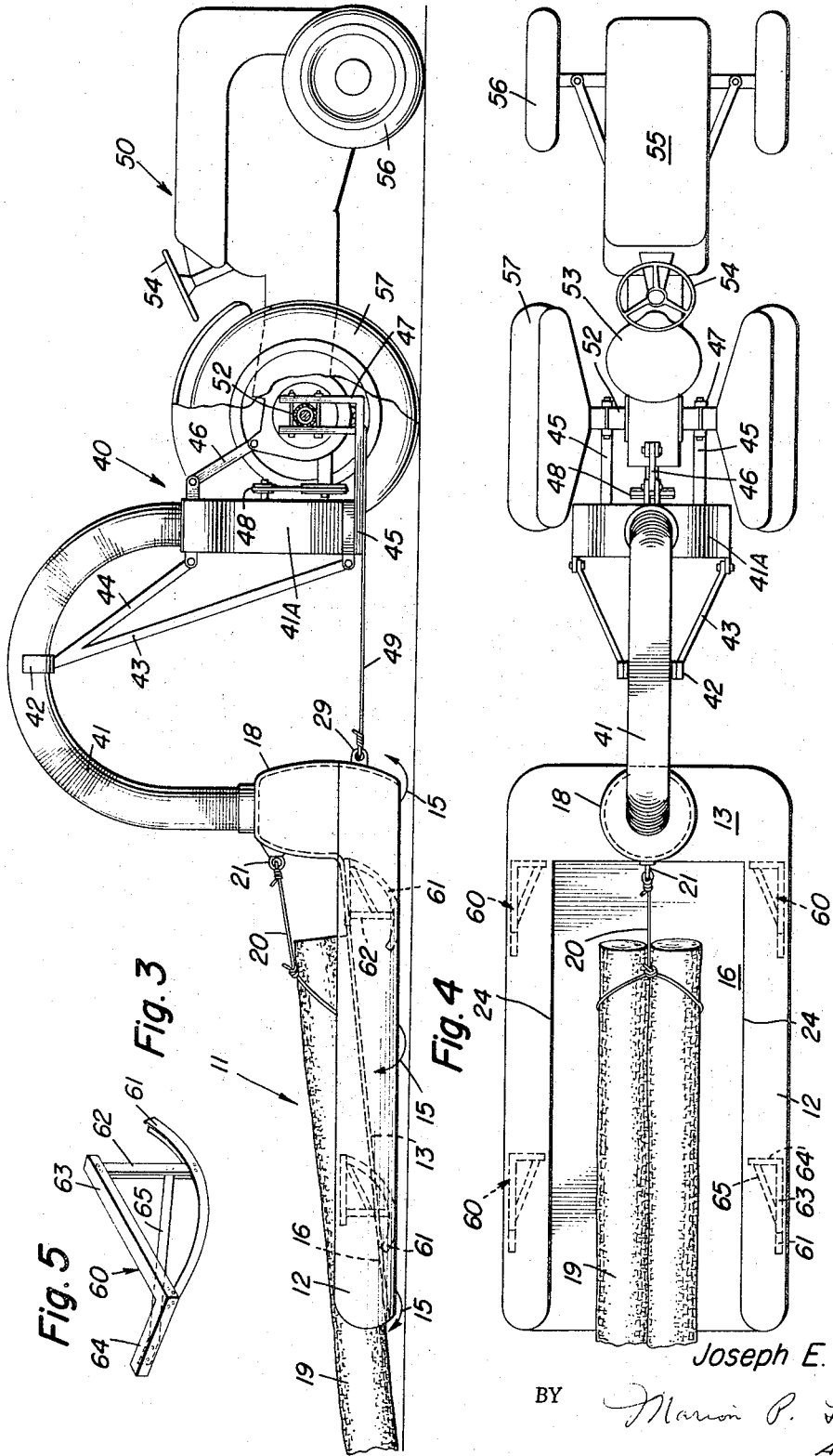

United States Patent Office 3,339,656
Patented Sept. 5, 1967

3,339,656
LOG-SKIDDING AIR PAN
Joseph E. Blonsky, Summerville, S.C., assignor to West Virginia Pulp and Paper Company, New York, N.Y., a corporation of Delaware
Filed Oct. 22, 1965, Ser. No. 501,639
3 Claims. (Cl. 180—7)

This invention relates to a ground-effect machine. In particular, it relates to a load-carrying ground-effect machine which is operated in combination with a power-supplying and towing vehicle and specifically relates to this combination when used in wood procurement over marshy terrain.

A ground-effect machine (hereinafter referred to as a GEM) is a vehicle adapted to ride on an air cushion formed by forcing air through an opening in the underside of the vehicle body to create a flow of pressurized air between the bottom of the vehicle and the closely-adjacent surface over which the GEM is operating. Curtain means at the side of the vehicle may be provided to minimize outward escape of air. An underlying cushion of pressurized air consequently supports the machine.

The lifting capacity of a GEM depends upon the pressure developed within the pressurized air cushion and upon the plan area of the air cushion. Lifting capacity minus machine weight equals load-carrying capacity of a GEM having a pressurized air cushion of fixed pressure and plan area. A large part of the machine weight necessarily results from the power generating means which compresses air and forces it beneath the GEM.

It is the object of this invention to provide a GEM having high load-carrying capacity by cooperatively operating the GEM in combination with a towing vehicle which supplies power for maintaining the air cushion beneath the GEM.

It is a further object of this invention to provide a GEM of exceptional load-carrying capacity by cooperatively operating the GEM in combination with a towing vehicle which supplies pressurized air to the GEM.

A GEM which lacks its own power generating means is hereinafter identified as an air pan. The instant combination by-passes numerous flotation and control problems which beset a singly-operated GEM.

Flotation problems are particularly severe in marshy and swampy areas where muck, potholes, stumps, roots, fallen trees, shallow water underlain with peat, and extensive savannahs of marsh grass form a peculiar type of irregular and yielding terrain. In these marshy areas, it frequently happens that tractors become mired to the belly pan or tend to overturn when towing heavy loads, such as logs. Arched towing machines, from which the front ends of skidded logs are suspended, can minimize frictional drag and substantially eliminate stopping torque when attached to the rear of the tractor, but the additional wheels also present additional opportunities for wheels to sink in holes, to catch on roots, trees, and stumps, and to be damaged.

Combining an air pan, upon which the front ends of skidded logs rest, with a power-supplying tractor decreases drag more efficiently than by use of an arched towing machine with a tractor and avoids many additional flotation hazards to which the two extra wheels of an arched towing machine are normally subjected.

The invention may be more readily understood by studying the drawings.

FIGURE 1 is a side elevation view of an air pan which is elevated above the closely-adjacent ground by an air cushion while supporting the forward ends of towed logs and being towed by a tractor which is supplying power to a propeller on the air pan.

FIGURE 2 is a top view of the tractor, air pan, and logs shown in FIGURE 1.

FIGURE 3 is a side elevation view of another embodiment of the invention in which the air pan is supplied with compressed air through a flexible compressed air tube from a compressor on the tractor.

FIGURE 4 is a top view of the combination shown in FIGURE 3.

FIGURE 5 is a perspective view of a skidder which is attached to the air pan for directional guidance and for support when a pressurized air cushion is not present.

The two embodiments 10, 11 of an air pan which are shown in the drawings and described hereinafter comprise a plenum shell enclosing a plenum chamber 14, a load ramp 16, and a power-receiving means. The power-receiving means principally distinguish the embodiments. Air pan 10 receives torsional power from towing tractor 50 through an axially-mounted propeller 27 within blower chamber 17 by means of flexible shaft 28 from tractor 50, and air pan 11 receives pneumatic power, in the form of slightly compressed air, through flexible tube 41 from a fan mounted on tractor 50.

The blower-mounted air pan 10 and tractor 50 are connected by means of a hitch 30, as shown in FIGURES 1 and 2. Tube-attached air pan 11 and tractor 50 are connected with a towing assembly 40. Air pans 10, 11 have an encircling skirt 12 of any suitable type, such as an inflated rubber ring or side wall curtains. Skirt 12 and top wall 13 form a plenum shell enclosing a plenum chamber 14 within which a cushion of pressurized air is maintained while air pans 10, 11 are air-borne. Air streams 15 escape outwardly around the bottom edges of skirt 12 from this pressurized air cushion.

Blower-mounted air pan 10 and tube-attached air pan 11 differ as to shape of plenum chamber 14. Air pan 10 has a plenum chamber 14 of generally rectangular side cross-section, but air pan 11 has a plenum chamber 14 of triangular side cross-section, as shown in FIGURES 1 and 3. Air pan 10 has an attached skirt 12 which is generally flexible, but air pan 11 has a generally rigid skirt 12 which is an integral part of the plenum shell, as shown in FIGURES 3 and 4.

Centered in top wall 13 of air pan 10, a load ramp 16 slopes upwardly and forwardly above the skirt 12 and also narrows to the diameter of the blower chamber 17, as shown in FIGURE 2. The corresponding load ramp 16 of air pan 11 is rectangular in top view and slopes upwardly from the bottom of skirt 12 at the rear of air pan 11 to the top of skirt 12 at the tube receiver 18, as shown in FIGURE 4.

Side barriers 22 slope upwardly from back to front of air pan 10 to prevent logs 19 from swinging completely off load ramp 16 but allow considerable skewing of logs 19 relative to the fore-and-aft axis of air pan 10. Side braces 23 support side barriers 22 as shown in FIGURE 2. In contrast, inside edges 24 of top wall 13 act as side retaining barriers for air pan 11 and restrain logs 19 from skewing much more completely than do side barriers 22 of air pan 10.

Logs 19 are held on load ramp 16 of air pans 10, 11 by cables 20 which are attached to shackles 21. Front brace 25 is attached to blower chamber 17 and side barriers 22 of air pan 10. Bolt 26, which is attached to front brace 25, fastens pulling bar 32, to which shackle 21 is attached. Pulling bar 32 is movably attached to tractor 50 by means of the linkage assembly comprising members 33, 34, 35, and 36. Pulling force is thus transmitted directly through cable 20, shackle 21, bolt 26, and pulling bar 32.

Pulling bar 32 and the linkage assembly comprising members 33, 34, 35, and 36 form a three-point hitch such as are commonly used with small, farm-type, rubber-tired tractors of Ford or Massey-Ferguson manufacture. For no-load travel, when a pressurized air cushion is not necessary to provide support, the blower-mounted air pan 10 can be supported hydraulically on this three-point hitch in a raised position similar to the high-lift transport position which is commonly applied to farm implements such as disks and plows.

Additional support, when a pressurized air cushion is not being used during no-load travel and for protection from bumps and other shock-type overloads, is provided by tail skidders 60 which can also function as rudders. The tail skidder embodiment shown in the drawings comprises a single rudder 61, rudder column 62, rudder beam 63, rudder side support 64, and rudder brace 65. Each rudder beam 63 and rudder side support 64 is fastened rigidly to the underside of top wall 13, adjacent to skirt 12, so that single rudder 61 is aligned parallel to the fore-and-aft axis of air pan 10, and the bottom of single rudder 61 is approximately on the same level as the bottom of skirt 12. Rudder column 62 may be of special shock-absorbing construction, such as a coiled spring.

Blower-mounted air pan 10 requires only two skidders 60 in the rear, as shown in FIGURES 1 and 2. In the presence of a strong cross wind when empty, the three-point hitch can be lowered to allow the tail of air pan 10 to touch the ground lightly whereby sufficient resistance is available to minimize crosswind skidding.

Blower-mounted air pan 10 has blower chamber 17 at the forward end thereof in which propeller 27 on flexible shaft 28 rotates to blow air into the plenum chamber 14 whereby a cushion of pressurized air is created therein. Flexible shaft 28 is attached to the engine take-off 51 of towing tractor 50 through two universal joins 31 and pulley-and-shaft system 38.

Tube-attached air pan 11 receives air through flexible tube 41 which is attached to the top of tube receiver 18. Tube 41 rides loosely on semi-circular collar 42 at the end of dual supports 43 and single support 44, but this flexible tube 41 may be shortened considerably and be aligned substantially horizontally. Tube 41 is attached at its inlet end to vertical fan chamber 41A which is supported by bottom members 45 from truss 47 on axle 52 and by upper tension member 46 from the tractor rear end 53. A fan inside of vertical fan chamber 41A receives power from the tractor 50 through the pulley-and-shaft system 48.

Tube-attached air pan 11 requires skidders 60 to protect skirt 12 from deformation when a pressurized air cushion is not available for supporting the air pan 11 and to give guidance to the air pan 11 in a strong cross wind, particularly when empty. These skidders 60 extend downwards so that the bottom of single rudder 61 is approximately level with the bottom of skirt 12. As shown in FIGURES 3 and 4, four spaced skidders 60 are desirable so that air pan 11 can be supported evenly upon them, but two rear skidders and a single front skidder would be adequate.

Control of the air pressure within plenum shell 14 and placement of the load enables only the two rear skidders 60 to touch the ground when underway if a strong crosswind is blowing.

Tractor 50 pulls air pan 11 with cable 49 which is attached to shackle 29 on air pan 11. Tractor 50 has conventional seat 53, steering wheel 54, engine 55, front wheel 56, and rear wheels 57, as shown in the drawings, but tractor 50 may be tread-equipped or have other suitable wheel means.

Preferred embodiments of the invention for pulpwood procurement over marshy terrain have been shown and described, but it is apparent that many modifications may be made within the scope of the invention that permit a load-carrying GEM without a power-generating means of its own to operate in combination with a vehicle which tows the GEM and furnishes power to maintain a pressurized air cushion beneath the GEM. It is, therefore, to be understood that the invention is to be limited only according to the scope of the following claims.

I claim:
1. In combination with a tractor, a log-skidding air pan of generally rectangular plan view that receives power from, and is towed by, the tractor, comprising:
   (A) a plenum shell enclosing a plenum chamber, comprising a skirt, whose lower edge is closely adjacent to the ground, and a top wall that is joined without leakage to the upper edge of the skirt,
   (B) a power-receiving means delivering air under pressure to said plenum chamber,
   (C) a load ramp, upon which the front ends of skidded logs rest, that is the upper surface of said top wall, slopes upwardly from the rear end to the front end of the air pan, and is bordered by side barriers,
   (D) attachment means that transmit towing loads of air pan and logs to said tractor,
   (E) at least two skidders that are capable of functioning as rigid rudders for said moving air pan and of supporting the rear end of said air pan when power is not being supplied by the tractor, each skidder comprising:
      (1) a generally vertical rudder column that is attached at its top end to the underside of said top wall, near to the rear end of said air pan,
      (2) a smoothly curved rudder that is attached at one end to the underside of said top wall, forwardly of the rudder column, and is attached, on the concave side and near to the other end of said rudder, to the bottom end of said rudder column, whereby the convex side of said rudder contacts the ground when said air pan is not receiving power from the tractor, and
      (3) a side brace that is attached at one end to the underside of said top wall, generally transversely of said rudder column, and is attached at the other end to the bottom of said rudder column.

2. The combination of claim 1 wherein said tractor has an engine take-off and a three-point hitch, wherein:
   (A) said plenum chamber has a generally rectangular side cross section, said top wall having an opening therein, and said skirt encircles the air pan,
   (B) said power-receiving means comprise:
      (1) a generally cylindrical blower chamber that is mounted at the forward end of said air pan, at an acute angle to said top wall, and is attached to said top wall without leakage along the edges of said opening,
      (2) an axially-mounted propeller that is rigidly supported within said blower chamber at the forward end thereof,
      (3) a flexible shaft that rotatably connects said propeller to said engine take-off and transmits torsional power to said propeller,
   (C) said load ramp narrows from the full width of said air pan at the rear end thereof to the width of said blower chamber at the forward end of said air pan, and said side barriers are at a steeper angle to the ground than the skidded logs so as to prevent the towed logs from swinging completely off said air pan while allowing considerable skewing of the skidded logs relative to the fore-and-aft axis of said air pan, and
   (D) said attachment means are able to support the forward end of the air pan and comprise:
      (1) a front brace that is attached to said blower chamber and side barriers,
      (2) a pulling bar that is attached to said three-point hitch and to said front brace, and
      (3) a cable that is attached to said pulling bar and is selectively attached to logs to be skidded while the front ends of the logs rest upon said load ramp, 3. The combination of claim 1 wherein said tractor has an air compressor and a cable hitch, wherein:
- (A) said plenum chamber has a generally triangular side cross section, said skirt is rigid and continuously encircles only the front and sides of said air pan, and said top wall, at the front of said air pan, is attached without leakage to an upright tube receiver and, along the sides of said air pan, has downward-extending inside edges that act as said side barriers to skidded logs on said load ramp,
- (B) said power-receiving means being a flexible tube that is attached without leakage to said air compressor and to said tube receiver on said air pan, whereby pneumatic power at low pressure is transmitted to the underside of said air pan,
- (C) said load ramp being rectangular in plan view and slopes from the lower edge of said skirt, at the rear end of said air pan, forwardly and upwardly at approximately the same angle as the skidded logs, whereby the logs are substantially between said side barriers and are restrained from skewing,
- (D) said attachment means comprises a towing cable that is attached to the front end of said air pan and to said cable hitch on the tractor and a log cable that is attached to said tube receiver and to logs being skidded, and
- (E) at least one skidder is attached to the front end of said air pan in addition to said rear-end skidders in order to support said air pan when pneumatic power is not available.

References Cited

UNITED STATES PATENTS 3,185,238    5/1965    Coates _____ 180—7

FOREIGN PATENTS 1,338,368    8/1963    France.
1,348,086    11/1963    France.
  938,664    10/1963    Great Britain.

A. HARRY LEVY, *Primary Examiner.*